United States Patent [19]

Wilson et al.

[11] Patent Number: 4,708,719
[45] Date of Patent: Nov. 24, 1987

[54] DISPERSE DYE COMPOSITION FOR USE IN SOLVENT DYEING

[75] Inventors: Robert B. Wilson, Greenville, S.C.; William F. Pomeroy, Rocky Mount, N.C.

[73] Assignee: Crucible Chemical Company, Greenville, S.C.

[21] Appl. No.: 669,352

[22] Filed: Nov. 8, 1984

[51] Int. Cl.$^4$ .............................................. C09B 67/00
[52] U.S. Cl. ............................................. 8/580; 8/527; 8/528; 8/582; 8/583
[58] Field of Search ................... 8/524, 527, 528, 580

[56] References Cited

U.S. PATENT DOCUMENTS

| | | | |
|---|---|---|---|
| 4,286,960 | 9/1981 | Schneider et al. | 8/527 |
| 4,336,025 | 6/1982 | Schneider et al. | 8/527 |
| 4,389,213 | 6/1983 | Schneider et al. | 8/527 |
| 4,426,297 | 1/1984 | Wilson | 252/8.6 |
| 4,459,704 | 7/1984 | Sears et al. | 2/69 |

Primary Examiner—Paul Lieberman
Assistant Examiner—John F. McNally
Attorney, Agent, or Firm—Bailey & Hardaway

[57] ABSTRACT

A disperse dye concentrate for use in non-aqueous solvent systems, employing a disperse dye, comprises 10-95% by weight of dry disperse dye, free of water-soluble dispersing agents, admixed with one or more of:

(A) a cycloaliphatic diester of the formula

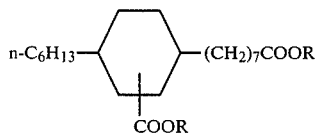

I wherein R is straight or branched chain alkyl of 4-20 carbon atoms, polyoxyalkylene of the formula $HO(CH_2CH_2O)_nCH_2CH_2—$, $HO(C_3H_6O)_nC_3H_6—$, $HO(CH_2CH_2)_p(C_3H_6O)_qC_3H_6—$ or $HO(C_3H_6O)_p(CH_2CH_2O)_qCH_2CH_2—$ or phosphated polyoxyalkylene, wherein n is 2-22 and the sum of p+q is n;

(B) a high boiling aromatic ester of the formula $$ArCOOR_2 \qquad \qquad II$$

or $$ArCOO—R_1—OOCAr \qquad \qquad III$$

wherein $R_1$ is alkylene of 2-8 carbon atoms or polyoxyalkylene of the formula $—C_rH_{2r}(OC_rH_{2r})_s—$, in which r is 2 or 3 and s is 1 to 15; $R_2$ is substituted or unsubstituted alkyl or alkenyl of 8-30 carbon atoms and Ar is substituted or unsubstituted mono- or bicyclic aryl of up to 15 carbon atoms; or (C) a high boiling alkylphenol ester of an aliphatic or aromatic monocarboxylic acid or a phosphoric acid of the formula $$R_3COOR_4 \qquad \qquad IV$$

or $$(HO)_2POOR_4 \qquad \qquad V$$

wherein $R_4$ is the residue of an ethoxylated alkylphenol of the formula

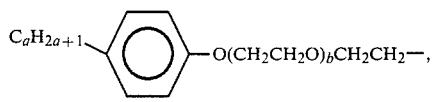

VI wherein a is 0-12 and b is 1-24 or an ethoxylated alkanol residue of the formula $$CH_3(CH_2)_c—O—(CH_2CH_2O)_d—CH_2CH_2— \qquad VII$$

wherein c is 7-22, d is 1-24 and $R_3$ is linear or branched chain alkyl of 1-21 carbon atoms, phenyl or tolyl.

17 Claims, No Drawings

DISPERSE DYE COMPOSITION FOR USE IN SOLVENT DYEING

TECHNICAL FIELD

This invention relates to dye concentrates for use in solvent dyeing of fibers, fabrics and textiles, made from thermoplastic materials.

BACKGROUND ART

Conventional exhaust dyeing processes use water as the medium in which the dye is transported to the material being dyed.

Many processes have been described in which the dye bath comprises a non-aqueous organic solvent. These baths frequently utilize a volatile organic solvent, for example, perchloroethylene. Although perchloroethylene provides a good medium for dyeing, closed or pressurized machinery is often required to prevent loss of solvent and to reach the temperature range, required for dyeing.

A continuous process for waterless dyeing of textile and plastic materials, employing high boiling solvents, has been proposed by Hermes in U.S. Pat. Nos. 4,047,889 and 4,055,971. The vehicle recited is a high boiling glycol or glycol ether.

Another process, disclosed in allowed U.S. application, Ser. Nos. 440,567 and 440,611, filed Nov. 10, 1982, abandoned in favor of application Ser. Nos. 574,953 and 574,952, filed Jan. 30, 1984, utilizes as the principal dyeing medium a stable high boiling ester or ester mixture. Because of the stability and low volatility of the composition, dyeings can be carried out under atmospheric pressure at temperatures as low as 160° C., typically 180°–190° C. The conditions disclosed by these applications, incorporated herein by reference, are eminently suited for the dyeing of polyester fibers with disperse dyes during very short dyeing cycles, frequently less than one minute.

Conventional disperse dyes normally contain water-soluble dispersing agents, and are generally unsuitable for use in non-aqueous solvent-based dyeing systems. Pure disperse dyes, without additives to aid dispersion or dissolution in the dyebath, are normally difficult to wet out and incorporate into the dye bath. Pure disperse dye means dye as manufactured and is typified, for example, by dried press-cake. Disperse dyes in this form may also suffer from batch-to-batch variation in strength and hue; such dyes are accordingly commercially unacceptable, without provision for standardization.

It is accordingly the object of this invention to provide a commercially-acceptable disperse dye concentrate of consistent strength and hue.

DISCLOSURE OF INVENTION

This invention relates to a disperse dye concentrate for use in waterless dyeing, comprising 10–95% by weight of a dry disperse dye, free of water-soluble dispersing agents, admixed with 90–5% by weight of one or more of:

(A) a cycloaliphatic diester of the formula

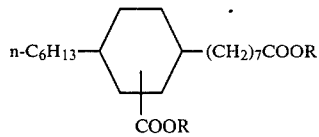

wherein R is substituted or unsubstituted straight or branched chain alkyl of 4–20 carbon atoms, polyoxyalkylene of the formula $HO(C_xH_yO)_nC_xH_y-$ or phosphated polyoxyalkylene, wherein $(C_xH_{2x}O)_n$ is $(CH_2CH_2O)_n$, $(C_3H_6O)_n$ or $(CH_2CH_2O)_p(C_3H_6O)_q$, n is 2–22 and the sum of p+q is n;

(B) a high boiling aromatic ester of the formula $$ArCOOR_2 \qquad \text{II}$$

or $$ArCOO-R_1-OOCAr \qquad \text{III}$$

wherein $R_1$ is alkylene of 2–8 carbon atoms or polyoxyalkylene of the formula $-C_rH_{2r}(OC_rH_{2r})_s-$, in which r is 2 or 3 and s is 1 to 15; $R_2$ is substituted or unsubstituted alkyl or alkenyl of 8–30 carbon atoms; and Ar is substituted or unsubstituted mono or bicyclic aryl of up to 15 carbon atoms; or (C) a high boiling ester of an aliphatic or aromatic monocarboxylic acid or a phosphoric acid of the formula $$R_3COOR_4 \qquad \text{IV}$$

or $(HO)_2POOR_4 \qquad \text{V}$ wherein $R_3$ is Ar or straight or branched chain alkyl of 8–18 carbon atoms and $R_4$ is the residue of an ethoxylated alkylphenol of the formula

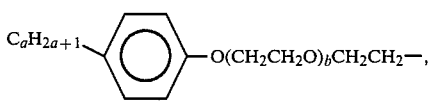

wherein a is 1–12 and b is 1–24 or of an ethoxylated alkanol residue of the formula $$CH_3(CH_2)_c-O-(CH_2CH_2O)_d-CH_2CH_2- \qquad \text{VII}$$

wherein c is 7–22, d is 1–24 and $R_3$ is linear or branched chain alkyl of 1–21 carbon atoms, phenyl or tolyl.

This invention further relates to a process for preparing disperse dye concentrates, wherein one or more esters of groups (A)–(C) is mixed with dry disperse dye, free of water-soluble dispersing agent, to provide a mixture, containing 10–95% by weight of the composition.

The cycloaliphatic diester employed in making the composition of this invention is prepared from a Diels-Alder adduct of acrylic acid and linoleic acid, as described by Ward in U.S. Pat. No. 3,753,968. The diacid has the formula

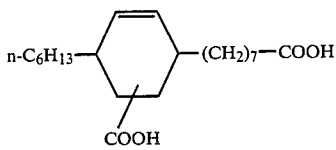

and therefore is a mixture of (5 and 6)-carboxy-4-hexyl-2-cyclohexene-1-octanoic acids. The diacid is available commercially from Westvaco, designated as "Diacid 1550".

Preparation of adducts from conjugated octadecadienoic acid and unsaturated acids and/or their hydrogenation has also been described by Teeter et al, *J. Org. Chem.*, vol. 22 (1957) at 512–514, Ward in U.S. Pat. No. 3,899,476 and Ward et al in U.S. Pat. No. 3,981,682.

The preparation of esters from the $C_{21}$ diacid adduct was reported by Ward et al, *J. Amer. Oil Chemists' Soc.*, vol. 57 (1957) at 219–224. Ethoxylated esters containing 4–119 ethylene oxide units are said to be effective lime soap dispersants. The alkyl esters are reported as being useful in lubricant applications, including use as textile lubricants and plasticizers for PVC.

The diacid can be esterified with alcohols using, for example, acidic catalysts such as p-toluenesulfonic acid, methanesulfonic acid or sulfuric acid. During the esterification, the reaction mixture is preferably also treated with a decolorizing agent, e.g., carbon or clay.

The diacid is reduced following esterification to a saturated cyclic compound. A nickel catalyst such as Raney Nickel, nickel on kieselguhr or nickel on alumina can be used. The required amount varies up to 5–10% by weight of the ester.

Hydrogenation is carried out after esterification to prevent nickel from complexing with the free acid. Other catalysts, e.g., platinum or rhodium, avoid this problem, but are prohibitive in cost. The catalyst can be removed by filtration through a plate and frame filter press. The product is the resulting filtrate.

Polyoxyalkylene diesters are prepared by reaction of the diacid, in the presence of an alkaline catalyst, with ethylene or propylene oxide. Reaction will occur at both acid sites. Addition of ethylene oxide is allowed to continue until the product becomes at least dispersible or, preferably, soluble in water. This will correspond to addition of a total of 5–25 ethylene oxide units. The product obtained using ethylene oxide has a structure before hydrogenation represented by the formula:

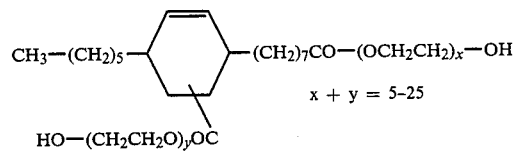

The phosphorylated product is readily obtained by reaction with phosphorus pentoxide. The saturated diester can be obtained by nickel-catalyzed hydrogenation.

In the case of the phosphorylated derivative, hydrogenation should precede phosphorylation. The phosphorylated derivatives can be converted to salts thereof by reaction with a metal hydroxide. Sodium and potassium salts are preferred.

Contemplated equivalents include compounds in which R is $ArCOO(CH_2CH_2O)_nCH_2CH_2$—. These compounds are obtained by treating polyoxyalkylene intermediates with an aromatic acid, e.g., benzoic or toluic acid, usually with an acidic catalyst. Hydrogenation of the double bond in the cycloaliphatic ring can be done before or after esterification with the aromatic acid.

Representative of substituted alkyl R which may be used in the products of this invention are butoxybutyl, 10-hydroxystearyl, 10-hydroxydecyl, 10-halostearyl, ω-alkanoyloxyalkyl or the like.

Preferred diesters for use in accordance with the principles of the invention are those wherein:

(a) R is straight or branched chain alkyl of 4–20 carbon atoms,
(b) R is 2-ethylhexyl, lauryl or stearyl,
(c) R is $HO(CH_2CH_2O)_nCH_2CH_2$—,
(d) R is $HO(C_3H_6O)_nC_3H_6$—,
(e) R is $HO(C_2H_4O)_p(C_3H_6O)_qC_3H_6$—, and
(f) R is $(HO)_2P=O(OCH_2CH_2)_nOCH_2CH_2$— or a salt thereof.

"High boiling aromatic ester," as used in the specification and claims, means an ester formed by reaction between a mono- or dihydric alcohol and an aromatic acid, so as to accomplish complete esterification of all hydroxyl functions therein. Compounds within this class include esters of the formula $ArCOOR_2$, wherein Ar is substituted or unsubstituted mono- or bicyclic aryl of up to 15 carbon atoms and $R_2$ is substituted or unsubstituted alkyl or alkenyl of 8–30 carbon atoms. Also included within the definition of aromatic esters are those of the formula $Ar-COO-R_1-OOCAr$, wherein Ar is as above and $R_1$ is alkylene of 2–8 carbon atoms or polyoxyalkylene of the formula $-C_rH_{2r}(O-C_rH_{2r})_s$, in which r is 2 or 3 and s is 1 to 15.

Accordingly, aromatic esters used in this aspect of the invention include, but are not limited to, esters of benzoic, toluic, dimethylbenzoic, trimethylbenzoic, naphthoic, butylbenzoic and similar acids.

When aromatic diesters of dihydric alcohols are used, alkylene ($R_1$) can be ethylene, propylene, hexylene, 2,2-dimethyltrimethylene, butylene, heptamethylene and octylene, including various isomers thereof.

Polyoxyalkylene diesters include those derived from polyethylene glycol or polypropylene glycol.

In the case of aromatic esters of monohydric alcohols, alkyl ($R_2$) can be octyl, nonyl, decyl, dodecyl, tridecyl, hexadecyl, stearyl and alkenyl can be any corresponding monounsaturated function, e.g., oleyl.

Preferred among aromatic esters of mono- or dihydric alcohols are those wherein:

(a) Ar is phenyl,
(b) Ar is tolyl,
(c) $R_1$ is ethylene or propylene, including each of (a) and (b),
(d) $R_1$ is ethyleneoxyethylene or propyleneoxypropylene, including each of (a) and (b),
(e) $R_1$ is polyoxypropylene of molecular weight 200–250, including each of (a) and (b), and
(f) $R_2$ is decyl, dodecyl, hexadecyl, tridecyl, octadecyl or oleyl, including each of (a) and (b).

Contemplated equivalents of the aromatic esters described above include esters of benzyl alcohol and substituted or unsubstituted aromatic acids of 6 or more carbon atoms, or substituted or unsubstituted aliphatic acids of 8 or more carbon atoms, including but not limited to, benzyl laurate, benzyl pelargonate, benzyl octoate, benzyl palmitate, benzyl stearate, benzyl oleate, benzyl hydroxystearate or benzyl benzoate. It will be understood that esters of substituted benzyl alcohols can also be used.

Esters falling within the definition of $R_3COOR_4$ and $(HO)_2POOR_4$ are those wherein $R_4$ is a residue of an alkoxylated alkylphenol of the formula

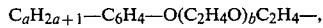

wherein a is 0-12 and b is 1-24. Accordingly, exemplary materials include ethoxylated alkylphenols. Preferred alkylphenols are nonylphenol, octylphenol and dodecylphenol. It will be understood that the alkylphenols can include mixtures.

Most preferably, the alkoxylated alkylphenols will be ethoxylated derivatives, having 5-10 ethylene oxide units.

Ethoxylated alkanols will be as above, and can include mixtures. Preferred compounds are those wherein c is 6-12 and d is 2-10.

Alkoxylated alkylphenols and alkoxylated alkanols, containing various numbers of alkoxyl units, are commercially available materials.

The compositions of this invention can contain at least 5% by weight of an additional high boiling ester, comprising an ester of terephthalic acid and a polyoxyethylated alkylphenol (D). These are compounds of the formula

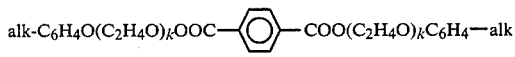

wherein alk is straight or branched chain alkyl of 4-15 carbon atoms and k is 3-20.

It will be understood that alk-$C_6H_4OH$ includes products known as octylphenol, nonylphenol and dodecylphenol, which are alkylation products of propylene or butylene oligomers. There products are actually mixtures of compounds, as is the case for compounds of formulas VI and VII, above.

The number of oxyethylene units, designated here as k and designated in formulas VI and VII as b and d, respectively, also represents an average of a mixture of compounds.

In the bisterephthalate esters (D), employed as an optional ingredient of compositions of this invention, it is preferred that the alkylphenol be selected from octylphenol or nonylphenol and that the degree of ethoxylation be 4-6, that is, k is 3-5.

The terephthalate esters, as well as the alkylphenol esters of formulas VI and VII, can be made by reaction between an excess of polyoxyalkylated alkylphenol or alkoxylated alkanol and a corresponding acid or lower alkyl ester, for example, dimethyl terephthalate or methyl laurate. Normally, the reaction is carried out under conditions in which water or a lower boiling alcohol is removed from the reaction site by distillation.

The compositions of this invention can also contain at least 5% by weight of an aromatic glyceryl triester (E), that is, a compound of the formula

wherein Ar is as above.

The compositions of this invention can similarly contain at least 5% by weight of a polyalkyl esters of benzene polycarboxylic acids (F). These are compounds of the formula

wherein z is 3, 4, 5, or 6; z' is 6−z; and $R_5$ is a straight or branched, substituted or unsubstituted higher alkyl of 6-22 carbon atoms.

These materials, also known as aromatic polyesters, are formed by reaction between a polybasic aromatic acid of the benzene series and a higher alkanol, so as to accomplish complete esterification of all carboxyl functions therein. "Higher alkanol" means a substituted or unsubstituted alkanol of at least six carbon atoms, for example, hexanol, octanol, 2-ethylhexanol, isodecanol, decanol, hexadecanol, ocatadecanol, docosanol, oleyl alcohol, linoleyl alcohol or the like.

The esters can be made by reaction between, for example, trimellitic acid and the selected alkanol, conveniently so as to remove or entrain by-product water. Alternatively, the aromatic polyesters can be prepared by transesterification between a lower ester, e.g trimethyl trimellitate and the higher alkanol. In this type of reaction, the lower boiling alcohol will normally be removed from the reaction site by distillation.

Included among aromatic esters of group (F) are esters of benzenetri-, -tetra-, penta- and hexacarboxylic acids. Accordingly, esters of prehnitic, mellophanic, pyromellitic, trimesic, trimellitic and hemimellitic acids are included, as well as esters of benzenepentacarboxylic acid and mellitic acid.

Although esters of any of the benzenecarboxylic acids can be used, it is preferred to use triesters of 1,2,4-benzenetricarboxylic acid, also known as trimellitic acid. Preferred esters are tris(2-ethylhexyl)trimellitate, trisisodecyl trimellitate, trisisooctyl trimellitate, tridecyl trimellitate and trihexadecyl trimellitate. It will be understood that mixed esters, such as hexyl, octyl, decyl trimellitate can also be used. Most preferred is tris(2-ethylhexyl)trimellitate (CAS No. 3319-31-1), also known as trioctyl trimellitate, which can be bought from Eastman Chemical Products, Inc., Kingsport, Tenn., as Kodaflex ®TOTM.

"Disperse dye," as used in the specification and claims, means any water-insoluble dye. These dyes contain few, if any, water-solubilizing functions, such as sulfonic acid groups. The compounds known as disperse dyes include, as exemplary, but not limiting embodiments, dyes having azo, azomethane, nitroarene and anthraquinone chromophores. Representative of these dyes are Serilene Yellow 3GL (C.I. Disperse Yellow 54), Serilene Red 2BL (C.I. Disperse Red 60), Serilene Navy Blue 2GN-LS (C.I. Disperse Blue 79), Serilene Red 3B-LS (C.I. Disperse Red 82), Serilene Blue 4RL (C.I. Disperse Violet 27), Serilene Rubine 2B-LS (C.I. Disperse Violet 33), Serilene Yellow YGL (C.I. Disperse Yellow 59) and Serilene Scarlet G-LS (C.I. Disperse Red 54).

It is preferred that the compositions of this invention contain 15-85% by weight of the disperse dye. It will be understood that compositions containing smaller amounts of dyes will be semi-liquid or pastes, whereas compositions containing greater amounts of dye will be powdery. It will also be understood that the dyes may be subjected to mechanical processes for particle size reduction, either before or during preparation of the compositions of this invention.

The components of the composition can be mixed by simply stirring or by vigorous mechanical action, for example, in a roller mill or ball mill, to provide for reduction of particle size of the dye. Alternatively, particle size of the dye can be reduced by dry-milling prior to formulation of the dye concentrates.

When more than one of the compounds of groups (A)–(F) is being employed in formulating a dye concentrate, the esters can be mixed simultaneously with the dry disperse dye or may be mixed therewith sequentially.

The dye concentrates of this invention can contain one or more stabilizers, such as triphenyl phosphite or 2,2'-oxamidobis[ethyl 3-(3,5-di-tert-butyl-4-hydroxyphenyl)propionate]. The amount of stabilizer may be 0.1–1.0% by weight of either of the foregoing or 0.1–0.5% by weight of each.

Preferred embodiments of the dye concentrates of the invention comprise:

I. compositions containing 15–85 parts by weight of disperse dye and 85–15 parts by weight of cycloaliphatic diester of formula I, most preferably the 2-ethylhexyl or lauryl diester;

II. 75–85 parts by weight of disperse dye; 15–20 parts of cycloaliphatic diester of formula I, most preferably the 2-ethylhexyl or lauryl ester; 1–5 parts by weight of alkyl benzoate, preferably the decyl, lauryl or myristyl ester, and 1–5 parts by weight of phosphated ethoxylated nonylphenol, having 4–6 oxyethylene units;

III. 15–25 parts by weight of disperse dye, 60–70 parts of cycloaliphatic diester of formula I, most preferably the bis(2-ethylhexyl) or bislauryl ester; 10–20 parts by weight of alkyl benzoate, particularly a decyl, lauryl or myristyl ester;

IV. 30–40 parts by weight of disperse dye, 35–45 parts of by weight of cycloaliphatic diester of formula I, most preferably the bis(2-ethylhexyl) or bislauryl ester; and 15–25 parts by weight of a dibenzoate of polypropylene glycol (r is 3, s is 6–8);

V. a composition containing 15–85 parts by weight of disperse dye and 85–15 parts by weight of a 40:60 to 60:40 mixture of cycloaliphatic diester, particularly the bis(2-ethylhexyl) or bislauryl ester of formula I and a terephthalate ester of polyoxyethylated nonylphenol, wherein k is 2–4 and VI. a composition containing 15–85 parts by weight of disperse dye and 85–15 parts by weight of a 10:90 to 30:70 mixture of cycloaliphatic ester, particularly the bis(2-ethylhexyl) or bislauryl ester of formula I and trioctyl trimellitate.

BEST MODE FOR CARRYING OUT THE INVENTION

A most preferred composition is that containing 15–85 parts by weight of disperse dye and 85–15 parts by weight of a 60:40 to 40:60 mixture of bis(2-ethylhexyl)cycloaliphatic diester of formula I and a bisterephthalate ester of polyoxyethylated nonylphenol, wherein k is 2–4.

An equally preferred composition is that containing 15–85 parts by weight of disperse dye and 85–15 parts by weight of a 20:80 mixture of bis(2-ethylhexyl)cycloaliphatic diester and trioctyl trimellitate.

Without further elaboration, it is believed that one skilled in the art can, using the preceding description, utilize the present invention to the fullest extent. The following specific embodiments are, therefore, to be construed as merely illustrative and not limitative of the remainder of the disclosure in any way whatsoever. In the following examples, the temperatures are set forth uncorrected in degrees Celsius. Unless otherwise indicated, all parts and percentages are by weight.

EXAMPLE 1

Preparation of Propylene Glycol Dibenzoate

To a 3-necked flask fitted with stirrer, condenser, receiver, thermometer, nitrogen purge and heating mantle were charged 84 g (1.1 mole) of propylene glycol, 244 g (2 moles) of benzoic acid and 0.8 g of p-toluenesulfonic acid. Air was purged from the flask with nitrogen and the contents of the flask were heated to 160°–170° C. Water formed by the reaction was removed continuously. The reaction was continued until the product had an acid value below 5 mg KOH/g. The product was cooled and filtered.

Other esters are prepared using the following reactants:

(1) dipropylene glycol and benzoic acid, 1:2 molar ratio
(2) PPG 200 and benzoic acid, 1:2 molar ratio
(3) PPG 500 and benzoic acid, 1:2 molar ratio

EXAMPLE 2

Preparation of Polyoxyethylene Nonylphenyl Laurate

To a three-necked flask fitted out as in Example 1 was charged 750 g (1.1 moles) of polyoxyethylated nonylphenol (9.5 moles of oxyethylene, NP 9.5), 208 g (1 mole) of lauric acid and 2.4 g of p-toluenesulfonic acid. Air was purged from the flask with nitrogen and the mixture was heated to 160°–170° C. until an acid value below 10 mg/KOH was obtained. The product was cooled and filtered.

Other polyoxyethylene compounds are made in a similar fashion from:

(1) NP 9.5 and coconut fatty acid, 1:1 molar ratio
(2) NP 9.5 and oleic acid, 1:1 molar ratio
(3) NP 9.5 and stearic acid, 1:1 molar ratio
(4) NP 9.5 and benzoic acid, 1:1 molar ratio.

EXAMPLE 3

Preparation of Unsaturated Cycloaliphatic Diester: (R is 2-ethylhexyl)

To a three-necked flask fitted with stirrer, thermometer, nitrogen purge, condenser, side-arm receiver and heating mantle were charged 352 g (1 mole) of Diacid 1550, 273 g (2.1 moles) of 2-ethylhexanol, 1.5 g of p-toluenesulfonic acid and 2 g of decolorizing carbon. Air was purged from the flask with nitrogen and the reaction mixtue was stirred and heated to 160°–170° C. for 4–6 hours. Water formed during the reaction was collected in the side-arm receiver. The reaction was continued until the acid value was below 5 mg KOH/g. The catalyst and carbon were removed by filtration. The ester product and 25 grams of nickel on kieselguhr were charged to a stirred, heated pressure vessel. The mixture was heated to 160°–170° C. and pressurized to 400 psig with hydrogen. A sample was removed after 6–8 hours for determination of the iodine value. The reaction was continued until the iodine value was below 0.5 g of iodine/100 g of sample.

The product was cooled to 50° C. and the catalyst was removed by filtration.

Esters are prepared similarly from:

(1) Diacid 1550 and decyl alcohol, 1:2 molar ratio (2) Diacid 1550 and tridecyl alcohol, 1:2 molar ratio
(3) Diacid 1550 and Neodol 25 (a mixture of 12-15 carbon alcohols), 1:2 molar ratio.

EXAMPLE 4

A. Preparation of Polyoxyethylene Unsaturated Cycloaliphatic Diester: (R is HO(CH$_2$CH$_2$O)$_n$CH$_2$CH$_2$—)

To a stirred autoclave fitted with heating and cooling coils was charged 352 g (1 mole) of Diacid 1550. Catalyst (1.0 g of potassium hydroxide) was charged to the reactor. The temperature was raised to 110° C. and the reactor was vacuum stripped for 30-60 minutes to remove any residual water from previous washing of the reactor or from one or more of the charged reactants or catalyst. The reactor was purged with nitrogen to remove air, evacuated again and purged again with nitrogen. The contents of the reactor were stirred and heated to 140° C. and 100 g (2.3 moles) of ethylene oxide was added to the reactor. The pressure inside the reactor immediately built up to 30-50 psig. After 30-60 minutes' induction time, an exothermic polymerization reaction (to 150°-160° C.) began. The reaction was accompanied by a pressure drop to zero (0 psig) as the ethylene oxide was consumed. Ethylene oxide was added to the reactor to a total of 660 g (15 moles). The temperature was maintained at 150°-160° C. by cooling. Addition of ethylene oxide was stopped and the reaction was allowed to continue for 30 minutes more. The reactor was cooled to 90°-100° C. and purged twice with nitrogen.

A sample of the product had a hydroxyl value of 110 mg of KOH/g (15 moles of ethylene oxide added to the diacid.) The diester was acidified with acetic acid to neutralize the potassium hydroxide catalyst and treated with 3 g of hydrogen peroxide to bleach and lighten the color of the product. The reactor was cooled to 30° C. prior to removing the product, which was filtered through filter paper, using a porcelain filter.

B. Reduction to the Polyoxyethylene Diester

The product of Example 4A and 25 g of nickel on kieselguhr were charged to a stirred, heated pressure vessel. The mixture was heated to 160°-170° C. and pressurized with hydrogen to 400 psig. After 6-8 hours, samples were removed at intervals for determination of the iodine value. The reaction was continued until the iodine value was less than 0.5 g/100 g of sample.

EXAMPLE 5

Preparation of Phosphated Polyoxyethylene Diester: (R is (HO)$_2$P(=O)(OCH$_2$CH$_2$)$_n$OCH$_2$CH$_2$—)

Polyoxyethylated (15 moles of ethylene oxide) diacid, obtained as in Example 4B was heated to 50°-60° C., stirred and purged thoroughly with nitrogen to remove air. To about 1015 g (1 mole) of this material was added 24 g (0.17 mole) of phosphorus pentoxide. An exothermic reaction began immediately, with an exotherm to 85°-95° C. The reaction mixture was maintained at this temperature by cooling and an additional 24 g (0.17 mole) of phosphorus pentoxide was added. The reaction was continued for three hours after all of the phosphorus pentoxide was added. The reactor was cooled to 50° C. prior to removal of a sample. The acid value of the product was 32 mg KOH/g, indicating that the reaction was complete. The batch was bleached at 85°-95° C. with 5 g of hydrogen peroxide, cooled to 30° C. and filtered.

EXAMPLE 6

Aroylpolyoxyethylene Cycloaliphatic Diester

An aroylpolyoxyethylene cycloaliphatic diester was synthesized in a two-liter autoclave fitted with nitrogen purge, condenser and receiver for the removal of by-product water. Charge weights were:

510.0 g.: Diacid 1550
2.0 g.: flake caustic
636.0 g.: ethylene oxide

After purging the system with nitrogen, Diacid 1550 and caustic were heated to 130° C. Ethylene oxide was added over a four-hour period, during which the temperature was kept at 150°-165° C. The resulting ethoxylated product was cooled to 90° C. for removal of a sample. The hydroxyl value was 139. To this intermediate was added:

3.5 g.: acetic acid (glacial)
7.5 g.: methanesulfonic acid (70%)
340.0 g.: benzoic acid After purging with nitrogen, the temperature of the mixture was raised to and held at 165°-170° C. until the acid value was less than 5 mg KOH per gram. The theoretical amount of water was removed during the reaction and collected in the receiver. The sample was cooled and filtered.

The filtered product was hydrogenated in a two-liter autoclave:

1000.0 g: ethoxylated product, above
50.0 g: Raney nickel
QS: hydrogen

The reduction was run at 100°-125° C. and 200-250 psig until hydrogen consumption ceased. The product was cooled and filtered.

A propoxylated dibenzoate ester was prepared in a similar fashion.

EXAMPLE 7

Serilene Blue RL (20 parts, C.I. Disperse Blue 56), in dry press-cake form, was stirred with 80 parts of a cycloaliphatic diester of formula I (R is 2-ethylhexyl) at room temperature until a thick paste was obtained.

The resulting composition (16 parts) was added to a dyebath comprising 1000 parts of the same cycloaliphatic diester. The paste was readily incorporated into the dyebath. Dry dye added directly to the diester was found to be wetted out with difficulty and took longer to be completely incorporated into the dyebath, than when utilized in the form of the paste concentrate.

The dyebath was heated to 180° C., after which 20 parts of polyester fabric was immersed therein for 40 seconds, removed and washed well with perchloroethylene at room temperature. The polyester was uniformly dyed to a full blue shade and had good light and wash fastness.

The following compositions were prepared as above, using different dyes. All compositions were suitable for preparation of solvent dyebaths as above.

| Dye (dry press cake) | C.I. Disperse | Parts dye | Parts diester | Form of Product |
|---|---|---|---|---|
| Serilene Yellow 3GL | Yellow 54 | 80 | 20 | powder |
| Serilene Red 2BL | Red 60 | 20 | 80 | thick paste |
| Serilene Navy Blue 2GN-LS | Blue 79 | 75 | 25 | powder |
| Serilene Red 3B-LS | Red 82 | 25 | 75 | thick paste |

EXAMPLE 8

Serilene Blue RL (80 parts, dry ground press-cake) was stirred at 35° C. with 16 parts of cycloaliphatic diester (R is 2-ethylhexyl, compound A), 2 parts of an ester of formula II (lauryl benzoate, compound B) and 2 parts of a phosphate ester of formula V, in which $R_4$ is the residue of nonylphenol, ethoxylated with 5 moles of ethylene oxide (compound C).

The dye absorbed the mixture of esters to give a powdery composition, which was readily incorporated into a solvent dyebath of bis(2-ethylhexyl)cycloaliphatic diester. The dye bath was stable and there was no significant dye precipitation.

Further compositions are made as above, as shown in Table I:

EXAMPLE 9

A mixture of 65 parts of cycloaliphatic diester (A, R is 2-ethylhexyl) and 15 parts of lauryl benzoate (B) was heated to 120° C. To the hot mixture was added with stirring 20 parts of Serilene Blue 4RL (C.I. Disperse Violet 27) dry press-cake. The paste composition, which resulted from cooling the foregoing mixture, was readily incorporated into high boiling solvent baths of cycloaliphatic diesters of formula I. The dyebaths are stable at temperatures of about 180° C.

Other compositions, prepared in a similar fashion, wherein compounds A, B and C are as in Example 8, are shown Table II:

EXAMPLE 10

Serilene Red 2BL (C.I. Disperse Red 60) in the form of dried, ground press cake was mixed in a ball mill at room temperature with 40 parts of a biscycloaliphatic diester (R is 2-ethylhexyl) until a homogeneous mixture was obtained. To this was added 20 parts of a compound of formula III, in which Ar is phenyl and $R_1$ is the residue of polypropylene glycol (r is 3 and s is 7). Milling was continued until a uniform composition was obtained. The composition was brought to a predetermined standard strength by making incremental additions of the cycloaliphatic diester.

EXAMPLE 11

Serilene Blue RL (C.I. Disperse Blue 56, 80 parts) as the ground dry press-cake was mixed with 20 parts of Cruester 1000D-TR [Crucible Chemical Co., Greenville, S. Car., a 55:45 mixture of bis(2-ethylhexyl)cycloaliphatic diester and bis(nonylphenoxytetraethoxyethyl)terephthalate]. The dye concentrate (14 parts) was readily incorporated into a bath of 1000 parts of Cruester 1000D-TR into the latter. Polyester fabric (20 parts) was immersed in the resulting dyebath, kept at 185° C., for 35 seconds. The fabric sample was removed and washed thoroughly with perchloroethylene. The sample was dyed evenly to a full blue shade, and had good light and wash fastness.

The following compositions were prepared in a similar way and used in a dyebath of Cruester 1000D-TR:

| Dye | C.I. Disperse | Parts dye | Parts Cruester | Form of Product |
|---|---|---|---|---|
| Serilene Blue RL | Blue 56 | 20 | 80 | paste |
| Serilene Rubine 2B-LS | Violet 33 | 80 | 20 | powder |
| Serilene Yellow YGL | Yellow 59 | 60 | 30 | powder |
| Serilene Scarlet G-LS | Red 54 | 30 | 60 | thick paste |

TABLE I

| Example | Dye name | C.I. Disperse | parts | Compound A parts | Compound B parts | Compound C parts |
|---|---|---|---|---|---|---|
| 01 | Serilene Blue RL | Blue 56 | 80 | 10 | 7 | 3 |
| 02 | Serilene Red 2BL | Red 60 | 60 | 25 | 12 | 3 |
| 03 | Serilene Navy Blue 2GN-LS | Blue 79 | 80 | 14 | 6 | 0 |
| 04 | Serilene Yellow 3GL | Yellow 54 | 25 | 60 | 10 | 5 |
| 05 | Serilene Rubine 2B-LS | Violet 33 | 30 | 20 | 25 | 25 |
| 06 | Serilene Red 3BL | Red 82 | 30 | 25 | 30 | 15 |
| 07 | Serilene Blue 4RL | Violet 27 | 28 | 20 | 25 | 27 |
| 08 | Serilene Red R-LS | Red 177 | 32 | 25 | 23 | 20 |
| 09 | Serilene Blue RL | Blue 56 | 50 | 25 | 13 | 12 |
| 10 | Serilene Blue RL | Blue 56 | 40 | 10 | 40 | 10 |
| 11 | Serilene Yellow 3GL | Yellow 54 | 25 | 25 | 30 | 20 |
| 12 | Serilene Navy Blue 2GN-LS | Blue 79 | 40 | 15 | 25 | 20 |
| 13 | Serilene Blue RL | Blue 56 | 35 | 5 | 25 | 15 |
| 14 | Serilene Red 2BL | Red 60 | 25 | 60 | 0 | 15 |
| 15 | Serilene Red 2BL | Red 60 | 20 | 20 | 35 | 25 |
| 16 | Serilene Blue RL | Blue 56 | 85 | 0 | 12 | 3 |
| 17 | Serilene Red 3BL | Red 82 | 85 | 4 | 6 | 5 |

TABLE II

| Example | dye name | C.I. Disperse | parts | Compound A parts | Compound B parts | Compound C parts | Temperature of mixing °C. |
|---|---|---|---|---|---|---|---|
| 1 | Serilene Red 3B-LS | Red 82 | 30 | 30 | 25 | 15 | 115 |
| 2 | Serilene Blue 4RL | Violet 27 | 35 | 30 | 25 | 10 | 95 |
| 3 | Serilene Navy Blue 2GN-LS | Blue 79 | 80 | 15 | 3 | 2 | 70 |
| 4 | Serilene Blue RL | Blue 56 | 75 | 10 | 10 | 5 | 50 |
| 5 | Serilene Red 2BL | Red 60 | 30 | 60 | 5 | 5 | 105 |
| 6 | Serilene Red R-LS | Red 177 | 30 | 65 | 3 | 2 | 90 |
| 7 | Serilene Yellow 3GL | Yellow 54 | 25 | 68 | 5 | 2 | 55 |
| 8 | Serilene Yellow 2G-LS | Yellow 206 | 20 | 64 | 11 | 5 | 60 |

Any of the dye concentrates, prepared as above, could be used in the dyeing bath described.

EXAMPLE 12

Serilene Navy Blue 2GN-LS (C.I. Disperse Blue 79, dry press-cake form, 30 parts) was stirred into 70 parts of Cruester 1000D-TR, which had been preheated to 120° C. When all of the dye had dissolved, the mixture was allowed to cool with continued stirring. The cold product was a viscous paste, which was standardized to a predetermined strength by incremental additions of small amounts of Cruester 1000D-TR.

The product was readily incorporated into dyebaths, containing esters of groups (A)–(F).

EXAMPLE 13

Serilene Red 3B-LS (C.I. Disperse Red 82, dry press-cake form, 25 parts) was added to a ball mill, together with 75 parts of Cruester 1000D-TR. The two components wre milled together until the average dye particle size was reduced below 10 micrometers. Small additions of Cruester 1000D-TR were made to produce a composition of predetermined strength.

Owing to the small particle size of the dye, the composition thus prepared was incorporated particularly rapidly into dyebaths containing esters of formulas I–V. There was no precipitation of dye from the bath.

Other dye concentrates are made as in Tables IIIA-I-IID.

EXAMPLE 14

Serilene Brilliant Blue 2G (80 parts, C.I. Disperse Blue 60), in dry press cake form, was stirred at room temperature with 20 parts by weight of a mixture of 20 parts by weight of bis(2-ethylhexyl)cycloaliphatic diester of formula I, trioctyl trimellitate, triphenyl phosphite, 2,2'-oxamidobis[ethyl 3-(3,5-di-tert-butyl-4-hydroxyphenyl)propionate] (Naugard XL-1, Uniroyal Corp.) in a ratio of 19.6:80:0.2:0.2 parts by weight. The resulting product was a sticky powder.

The resulting composition (5 parts) was added to a dyebath comprising 1000 parts by weight of the same mixture of ester and was readily incorporated into the bath. It was found that attempted addition of dry dye directly to the bath took longer, than when the dye concentrate was used, and that the dry dye was wetted with difficulty.

After the dyebath was heated to 185° C., 14 parts of polyester fabric was immersed therein for 30 sec. The polyester fabric was removed and washed thoroughly with perchloroethylene at room temperature. The polyester was uniformly dyed to a full blue shade and had good light and wash fastness.

Similar results were obtained with dye concentrates, prepared as above from:

TABLE III

| Dye (as dry press cake) | | Compound of Formula I | | Compound of Formula III | | | | Compound of Formula IV | | | |
|---|---|---|---|---|---|---|---|---|---|---|---|
| | | | | | | | | $R_4$ = formula VI | | $R_4$ = formula VII | |
| C.I. Disperse | parts | R | parts | Ar | $R_1$ | parts | $R_3$ | a | b | c | d | parts |
| Blue 56 | 80 | 2-ethylhexyl | 16 | —$C_6H_5$ | —$CH_2CH_2$— | 2 | —$C_{17}H_{33}$ | 9 | 8 | — | — | 2 |
| Blue 56 | 30 | 2-ethylhexyl | 50 | —$C_6H_5$ | —$CH_2CH_2OCH_2CH_2$— | 12 | —$C_{17}H_{33}$ | 9 | 9 | — | — | 8 |
| Blue 79 | 80 | 2-ethylhexyl | 10 | —$C_6H_4$—p—$CH_3$ | —$C_3H_6OC_3H_6$— | 6 | —$C_{17}H_{35}$ | 9 | 8 | — | — | 4 |
| Blue 79 | 70 | 2-ethylhexyl | 10 | —$C_6H_4$—p—$CH_3$ | —$C_4H_8$— | 8 | —$C_{17}H_{35}$ | 9 | 8 | — | — | 12 |
| Red 82 | 35 | 2-ethylhexyl | 30 | —$C_6H_4$—p—COOH | —$CH_2CH_2(OCH_2CH_2)_5$— | 20 | iso-$C_{17}H_{35}$ | 9 | 9 | — | — | 15 |
| Violet 33 | 30 | 2-ethylhexyl | 45 | —$C_6H_4$—p—COOH | —$C_3H_6(OC_3H_6)_4$— | 15 | —$C_6H_5$ | 9 | 9 | — | — | 10 |
| Yellow 54 | 25 | 2-ethylhexyl | 50 | —$C_6H_4$—o—COOH | —$C_6H_{12}$— | 18 | —$C_6H_5$ | 9 | 8 | — | — | 7 |
| Red 177 | 40 | 2-ethylhexyl | 25 | —$C_6H_5$ | —$C_6H_{12}$— | 18 | —$C_6H_4$—p—$CH_3$ | 9 | 12 | — | — | 12 |
| Blue 280 | 65 | 2-ethylhexyl | 12 | —$C_6H_5$ | —$CH_2CH_2(OCH_2CH_2)_8$— | 11 | —$C_{11}H_{23}$ | 12 | 10 | — | — | 12 |
| Red 54 | 40 | —$C_{12}H_{25}$ | 16 | —$C_6H_5$ | —$CH_2CH_2OCH_2CH_2$— | 14 | —$C_{11}H_{23}$ | 12 | 9 | — | — | 30 |
| Yellow 59 | 30 | —$C_{12}H_{25}$ | 40 | —$C_6H_4$—p—$C_4H_9$ | —$CH_2CH_2$— | 8 | —$C_{17}H_{33}$ | — | — | 10 | 6 | 22 |
| Red 60 | 35 | —$C_{12}H_{25}$ | 8 | —$C_6H_4$—p—COOH | —$CH_2C(CH_3)_2CH_2$— | 12 | —$C_{17}H_{33}$ | — | — | 14 | 6 | 45 |
| Blue 79 | 45 | — | 0 | —$C_6H_5$ | —$C_6H_{12}$— | 28 | —$C_{17}H_{35}$ | — | — | 10 | 10 | 26 |
| Blue 56 | 40 | —($CH_2CH_2O)_5CH_2CH_2OH$ | 10 | —$C_6H_5$ | —$C_8H_{16}$— | 14 | —$C_{17}H_{35}$ | — | — | 12 | 7 | 36 |
| Red 60 | 30 | —($CH_2CH_2O)_7CH_2CH_2OH$ | 16 | —$C_6H_4$—p—COOH | —$C_8H_{16}$— | 12 | —$C_{11}H_{23}$ | — | — | 14 | 10 | 42 |
| Yellow 54 | 35 | —($C_3H_6O)_5C_3H_6OH$ | 25 | —$C_6H_4$—p—COOH | —$C_3H_6$— | 15 | —$C_6H_5$ | — | — | 14 | 10 | 25 |
| Red 92 | 30 | —($CH_2CH_2O)_3CH_2CH_2OPO(OH)_2$ | 40 | —$C_6H_4$—p—COOH | —$CH_2CH_2OCH_2CH_2$— | 15 | —$C_6H_5$ | — | — | 10 | 2 | 15 |
| Orange 25 | 20 | —($CH_2CH_2O)_6CH_2H_2OPO(OH)_2$ | 68 | —$C_3H_4$—p—$CH_3$ | —$C_3H_6OC_3H_6$— | 12 | —$C_6H_5$ | — | — | — | — | 0 |
| Red 60 | 40 | 2-ethylhexyl | 50 | — | — | 0 | —$C_6H_5$ | — | — | 10 | 6 | 10 |

| Dye (as dry press cake) | | Compound of formula I | | Compound of formula II | | | | Compound of formula IV | | | |
|---|---|---|---|---|---|---|---|---|---|---|---|
| | | | | | | | | $R_4$ = formula VI | | $R_4$ = formula VII | |
| C.I. Disperse | parts | R | parts | Ar | $R_2$ | parts | $R_3$ | a | b | c | d | parts |
| Blue 79 | 80 | 2-ethylhexyl | 10 | —$C_6H_5$ | —$C_9H_{19}$ | 4 | —$C_{17}H_{35}$ | 9 | 10 | — | — | 6 |
| Blue 56 | 70 | 2-ethylhexyl | 12 | —$C_6H_5$ | —$C_{12}H_{25}$ | 7 | —$C_{17}H_{33}$ | — | — | 11 | 6 | 11 |
| Red 60 | 33 | 2-ethylhexyl | 40 | —$C_6H_4$—p—$CH_3$ | —$C_{10}H_{21}$ | 8 | —$C_6H_5$ | 9 | 9 | 13 | 10 | 19 |
| Yellow 54 | 25 | 2-ethylhexyl | 20 | —$C_6H_4$—p—$CH_3$ | —$C_{12}H_{25}$ | 24 | —$C_6H_5$ | — | 4 | — | — | 31 |
| Red 177 | 40 | 2-ethylhexyl | 28 | —$C_6H_4$—p—COOH | —$C_{12}H_{25}$ | 12 | —$C_6H_4$—p—$CH_3$ | 10 | 9 | — | — | 20 |
| Blue 165:1 | 37 | 2-ethylhexyl | 30 | —$C_6H_5$ | —$C_9H_{19}$ | 9 | —$C_{11}H_{23}$ | 9 | 10 | — | — | 24 |
| Red 54 | 35 | 2-ethylhexyl | 35 | —$C_6H_4$—p—$CH_3$ | oleyl | 30 | — | — | — | — | — | 0 |
| Orange 25 | 38 | 2-ethylhexyl | 40 | — | —$C_{12}H_{25}$ | 0 | —$C_{17}H_{35}$ | 9 | 9 | — | — | 12 |
| Orange 80 | 28 | —$C_{12}H_{25}$ | 10 | —$C_6H_5$ | —$C_{10}H_{21}$ | 28 | —$C_{17}H_{35}$ | 10 | 9 | — | — | 34 |
| Red 177 | 30 | —$C_{12}H_{25}$ | 5 | —$C_6H_4$—p—COOH | —$C_{10}H_{21}$ | 8 | —$C_{17}H_{33}$ | 9 | 6 | — | — | 57 |
| Red 60 | 25 | —$C_{12}H_{25}$ | 25 | —$C_4H_4$—p—$CH_3$ | —$C_9H_{19}$ | 20 | —$C_6H_5$ | 9 | 5 | — | — | 30 |
| Blue 56 | 65 | — | 0 | —$C_6H_5$ | oleyl | 12 | —$C_6H_5$ | 6 | 9 | — | — | 23 |
| Blue 79 | 60 | —($CH_2CH_2O)_7CH_2CH_2OH$ | 9 | —$C_6H_5$ | —$C_9H_{19}$ | 13 | —$C_6H_4$—p—$CH_3$ | — | — | 11 | 10 | 18 |
| Red 60 | 70 | —($CH_2CH_2O)_5CH_2CH_2OH$ | 12 | —$C_6H_4$—p—COOH | —$C_{12}H_{25}$ | 18 | —$C_6H_4$—o—$CH_3$ | 6 | 9 | — | — | 0 |
| Blue 60 | 50 | —($C_3H_6O)_4C_3H_6OH$ | 10 | —$C_6H_4$—o—$CH_3$ | —$C_{10}H_{21}$ | 12 | —$C_{17}H_{35}$ | 6 | 5 | — | — | 28 |
| Red 60 | 42 | —($C_3H_6O)_6C_3H_6OH$ | 12 | —$C_6H_4$—p—COOH | —$C_{12}H_{25}$ | 18 | —$C_6H_5$ | 9 | 9 | — | — | 28 |
| Yellow 59 | 40 | —($C_3H_6O)_4(CH_2CH_2O)_3CH_2CH_2OH$ | 42 | —$C_6H_5$ | oleyl | 9 | —$C_{11}H_{23}$ | 6 | 6 | 14 | 6 | 9 |
| Yellow 54 | 37 | —($CH_2CH_2O)_3CH_2CH_2OPO(OH)_2$ | 45 | —$C_6H_4$—p—COOH | —$C_9H_{19}$ | 5 | —$C_6H_4$—p—$CH_3$ | — | 6 | — | — | 13 |
| Red 82 | 45 | —($CH_2CH_2O)_5CH_2H_2OPO(OH)_2$ | 42 | — | — | 0 | —$C_6H_5$ | 9 | 6 | — | — | 13 |

| Dye (as dry press cake) | | Compound of formula I | | Compound of formula III | | | Compound of formula V | | | |
|---|---|---|---|---|---|---|---|---|---|---|
| | | | | | | | $R_4$ = formula VI | | $R_4$ = formula VII | |
| C.I. Disperse | parts | R | parts | Ar | $R_1$ | parts | a | b | c | d | parts |
| Violet 33 | 30 | 2-ethylhexyl | 58 | —$C_6H_5$ | —$CH_2CH_2CH_2$— | 5 | 9 | 10 | — | — | 7 |
| Red 60 | 35 | 2-ethylhexyl | 25 | —$C_6H_5$ | —$C_3H_5OC_3H_6$— | 10 | 9 | 4 | — | — | 30 |

TABLE III-continued

| Dye (as dry press cake) | parts | Compound of formula I | | | Compound of Formula II | | | Compound of Formula V | | | |
|---|---|---|---|---|---|---|---|---|---|---|---|
| C.I. Disperse | parts | R | parts | Ar | $R_2$ | parts | $R_4$ = formula V (a) | $R_4$ = formula VI (b) | $R_4$ = formula VII (c) | (d) | |

| Dye | parts | R | parts | Ar | $R_2$ | parts | a | b | c | d |
|---|---|---|---|---|---|---|---|---|---|---|
| Red 92 | 35 | 2-ethylhexyl | 15 | —$C_6H_4$—p-$CH_3$ | —$C_6H_{12}$— | 18 | — | — | 11 | 6 | 32 |
| Blue 56 | 48 | 2-ethylhexyl | 43 | —$C_6H_4$—p-COOH | —$C_4H_8$— | 9 | 9 | 4 | — | — | 0 |
| Blue 79 | 57 | — | 0 | —$C_6H_4$—p-COOH | —$CH_2CH_2OCH_2CH_2$— | 12 | 9 | 3 | — | — | 31 |
| Red 54 | 47 | —$C_{12}H_{25}$ | 12 | —$C_6H_5$ | —$CH_2C(CH_3)_2CH_2$— | 18 | 9 | 5 | — | — | 23 |
| Yellow 54 | 40 | —$C_{12}H_{25}$ | 32 | —$C_6H_4$—p-COOH | —$C_5H_{16}$— | 7 | 9 | 7 | — | — | 21 |
| Yellow 59 | 46 | —$(CH_2CH_2O)_5CH_2CH_2OH$ | 14 | —$C_6H_5$ | —$C_3H_6$— | 18 | 9 | 9 | 13 | 8 | 22 |
| Red 60 | 37 | —$(CH_2CH_2O)_8CH_2CH_2OH$ | 7 | —$C_6H_4$—p-$CH_3$ | —$CH_2CH_2(OCH_2CH_2)_8$— | 8 | 9 | 7 | — | — | 44 |
| Orange 25 | 30 | —$(C_3H_6O)_4C_3H_6OH$ | 22 | —$C_6H_5$ | —$C_3H_6OC_3H_6$— | 22 | 9 | 4 | — | — | 26 |
| Orange 13 | 40 | —$(C_3H_6O)_3C_3H_6OPO(OH)_2$ | 42 | —$C_6H_4$—p-$CH_3$ | —$CH_2C(CH_3)_2CH_2$— | 11 | 9 | — | — | — | 7 |
| Blue 60 | 32 | —$(CH_2CH_2O)_7CH_2CH_2OH$ | 12 | —$C_6H_4$—p-COOH | —$C_3H_6(OC_3H_6)_4$— | 25 | — | 10 | 9 | 10 | 31 |
| Blue 56 | 56 | —$(CH_2CH_2O)_5CH_2CH_2CH$ | 16 | —$C_6H_5$ | —$CH_2CH_2(OCH_2CH_2)_5$— | 11 | 9 | 4 | — | — | 17 |
| Violet 27 | 35 | —$(CH_2CH_2O)_5CH_2CH_2OPO(OH)_2$ | 51 | — | — | 0 | 9 | 4 | — | — | 14 |
| Blue 79 | 65 | 2-ethylhexyl | 30 | —$C_6H_5$ | —$C_{12}H_{25}$ | 2 | 9 | 4 | — | — | — |
| Blue 56 | 52 | 2-ethylhexyl | 35 | —$C_6H_5$ | —$C_{12}H_{25}$ | 13 | 9 | 4 | — | — | — |
| Yellow 54 | 31 | 2-ethylhexyl | 44 | —$C_6H_4$—p-$CH_3$ | -oleyl | 17 | 9 | 8 | — | — | — |
| Red 60 | 36 | 2-ethylhexyl | 38 | —$C_6H_4$—o-$CH_3$ | —$C_9H_{19}$ | 16 | 9 | 7 | 11 | 4 | — |
| Blue 60 | 25 | 2-ethylhexyl | 58 | —$C_6H_4$—p-COOH | —$C_{12}H_{25}$ | 7 | 12 | 6 | — | 7 | — |
| Red 54 | 40 | 2-ethylhexyl | 44 | —$C_6H_4$—p-COOH | oleyl | 8 | — | — | — | — | — |
| Yellow 59 | 38 | 2-ethylhexyl | 44 | — | — | 0 | 9 | 4 | — | — | — |
| Blue 56 | 75 | — | 0 | —$C_6H_4$—p-COOH | —$C_{10}H_{21}$ | 25 | 9 | 10 | 9 | 3 | — |
| Red 177 | 25 | —$C_{12}H_{25}$ | 10 | —$C_6H_5$ | oleyl | 8 | — | — | — | — | — |
| Red 82 | 33 | —$C_{12}H_{25}$ | 14 | —$C_6H_4$—p-$CH_3$ | oleyl | 9 | 9 | — | 12 | 6 | — |
| Violet 27 | 42 | —$C_{12}H_{25}$ | 18 | —$C_6H_4$—p-COOH | —$C_{12}H_{25}$ | 22 | — | — | 14 | 8 | — |
| Violet 33 | 28 | — | 0 | — | — | 0 | 9 | 4 | 9 | 4 | — |
| Red 92 | 60 | —$(CH_2CH_2O)_7CH_2CH_2OH$ | 11 | —$C_6H_5$ | —$C_{12}H_{25}$ | 20 | — | — | — | — | — |
| Orange 80 | 44 | —$(CH_2CH_2O)_5CH_2CH_2OH$ | 7 | —$C_6H_4$—p-COOH | oleyl | 16 | 9 | 4 | — | — | — |
| Orange 93 | 37 | —$(C_3H_6O)_4C_3H_6OH$ | 12 | —$C_6H_4$—o-$CH_3$ | —$C_{18}H_{37}$ | 21 | — | 4 | 9 | 4 | — |
| Red 54 | 28 | —$(CH_2CH_2O)_4CH_2CH_2OPO(OH)_2$ | 41 | —$C_6H_5$ | —$C_9H_{19}$ | 11 | 9 | 4 | — | — | — |
| Orange 13 | 44 | —$(CH_2CH_2O)_7CH_2CH_2OPO(OH)_2$ | 35 | —$C_6H_4$—p-COOH | —$C_{16}H_{33}$ | 12 | 12 | 9 | — | — | — |

| Dye | C.I. Disperse | Parts Dye | Ester | Form of Product |
|---|---|---|---|---|
| Serilene Brilliant Blue 2G | Blue 20 | 20 | 80 | thin paste |
| Serilene Yellow 3GL | Yellow 54 | 40 | 60 | thick paste |
| Serilene Brilliant Blue 2G | Blue 60 | 50 | 50 | thick paste |
| Serilene Red TB-LS | Red 92 | 40 | 60 | thick paste |
| Serilene Red TB-LS | Red 92 | 20 | 80 | thin paste |

EXAMPLE 15

Serilene Red TB-LS (C.I. Disperse Red 92, dry press cake, 40 parts) was stirred into 60 parts of a mixture of trioctyl trimellitate, bis(2-ethylhexyl)cycloaliphatic diester, triphenyl phosphite and 2,2'-oxamidobis[ethyl 2-(3,5-di-tert-butyl-4-hydroxyphenyl)propionate], 19.6:80:0.2:0.2 parts by weight, respectively, which had been preheated to 120° C. When all of the dye had been wetted, the mixture was stirred and cooled. The cold product was a viscous paste, which was readily incorporated into dyebaths containing esters of groups (A)-(F).

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A non-aqueous disperse dye concentrate composition for use in non-aqueous solvent systems, employing a disperse dye, comprises 10-95% by weight of dry disperse dye, free of water-soluble dispersing agents, admixed with 90-5% by weight of one or more of:

(A) a cycloaliphatic diester of the formula

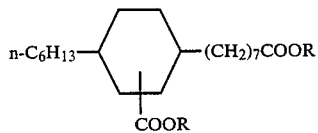

I wherein R is straight or branched chain alkyl of 4-20 carbon atoms, polyoxyalkylene of the formula $HO(CH_2CH_2O)_nCH_2CH_2-$, $HO(C_3H_6O)_nC_3H_6-$, $HO(CH_2CH_2)_p(C_3H_6O)_qC_3H_6-$ or $HO(C_3H_6O)_p(CH_2CH_2O)_qCH_2CH_2-$ or phosphated polyoxyalkylene, wherein n is 2-22 and the sum of p+q is n;

(B) a high boiling aromatic ester of the formula

ArCOOR$_2$

II or

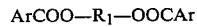

ArCOO—R$_1$—OOCAr

III wherein R$_1$ is alkylene of 2-8 carbon atoms or polyoxyalkylene of the formula $-C_rH_{2r}(OC_rH_{2r})_s-$, in which r is 2 or 3 and s is 1 to 15; R$_2$ is substituted or unsubstituted alkyl or alkenyl of 8-30 carbon atoms and Ar is substituted or unsubstituted mono- or bicyclic aryl of up to 15 carbon atoms; or (C) a high boiling alkylphenol ester of an aliphatic or aromatic monocarboxylic acid or a phosphoric acid of the formula

R$_3$COOR$_4$

IV or

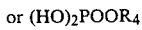

(HO)$_2$POOR$_4$

V wherein R$_3$ is Ar, straight chain alkyl or branched chain alkyl of 8-18 carbon atoms and R$_4$ is the residue of an ethoxylated alkylphenol of the formula

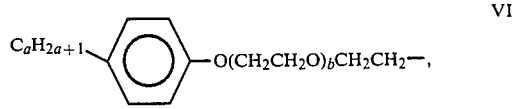

VI wherein a is 0-12 and b is 1-24 or an ethoxylated alkanol residue of the formula

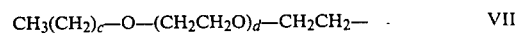

$CH_3(CH_2)_c-O-(CH_2CH_2O)_d-CH_2CH_2-$

VII wherein c is 7-22, d is 1-24 and R$_3$ is linear or branched chain alkyl of 1-21 carbon atoms, phenyl or tolyl.

2. The composition of claim 1, further comprising at least 5% by weight of an ester (D) of terephthalic acid and a polyoxyethylated alkylphenol of the formula

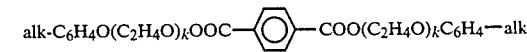

alk-C$_6$H$_4$O(C$_2$H$_4$O)$_k$OOC—⟨O⟩—COO(C$_2$H$_4$O)$_k$C$_6$H$_4$—alk wherein alk is straight or branched chain alkyl of 4-15 carbon atoms and k is 3-20.

3. The composition of claim 1, comprising 15-85% by weight of disperse dye and 85-15% by weight of cycloaliphatic diester.

4. The composition of claim 3, wherein the cycloaliphatic diester is the bis(2-ethylhexyl)ester.

5. The composition of claim 3, wherein the cycloaliphatic diester is the dilauryl ester.

6. The composition of claim 1, comprising 75-85% by weight of disperse dye, 15-20% by weight of cycloaliphatic diester, 1-5% by weight of alkyl benzoate and 1-5% by weight of phosphated ethoxylated nonylphenol, wherein b is 3-5.

7. The composition of claim 6, wherein the cycloaliphatic diester is the bis(2-ethylhexyl)ester or the dilauryl ester and the alkyl benzoate is the decyl, myristyl or lauryl ester.

8. The composition of claim 1, comprising 15-25% by weight of disperse dye, 60-70% by weight of cycloaliphatic diester and 10-20% by weight of alkyl benzoate.

9. The composition of claim 8, wherein the cycloaliphatic diester is the bis(2-ethylhexyl)ester or the dilauryl ester and the alkyl benzoate is the decyl, lauryl or myristyl ester.

10. The composition of claim 10, comprising 30-40% by weight of disperse dye, 35-45% by weight of cycloaliphatic diester and 15-25% by weight of polypropylene glycol dibenzoate.

11. The composition of claim 10, wherein the cycloaliphatic diester is the bis(2-ethylhexyl)ester or the dilauryl ester and the polypropylene glycol is that in which r is 3 and s is 6–8.

12. The composition of claim 2, comprising 15–85% by weight of disperse dye and 85–15% by weight of a 40:60 to 60:40 mixture of cycloaliphatic diester and terephthalate ester of polyoxyethylated nonylphenol.

13. The composition of claim 12, wherein the cycloaliphatic diester is the bis(2-ethylhexyl)ester and the terephthalate is that wherein k is 2–4.

14. The composition of claim 1, further comprising at least 5% by weight of an aromatic glyceryl triester of the formula $$ArCOOCH_2CH(OOCAr)CH_2OOCAr$$

wherein Ar is substituted or unsubstituted mono- or bicyclic aryl of up to 15 carbon atoms.

15. The composition of claim 1, further comprising at least 5% by weight of a polyalkyl ester of a benzenepolycarboxylic acid (F), having the formula $$C_6H_{z'}(COOR_5)_z,$$

wherein z is 3, 4, 5 or 6; z' is 6−z; and $R_5$ is straight or branched, substituted or unsubstituted higher alkyl of 6–22 carbon atoms.

16. The composition of claim 15, comprising 15–85% by weight of disperse dye and 85–15% by weight of a 10:90–30:70 mixture of cycloaliphatic diester and trioctyl trimellitate.

17. The composition of claim 16, wherein the cycloaliphatic diester is the bis(2-ethylhexyl) or dilauryl ester.

* * * * *